United States Patent [19]

Cuscurida

[11] Patent Number: 4,797,459

[45] Date of Patent: Jan. 10, 1989

[54] DISPERSING AGENTS FOR PRODUCING VINYL POLYMER POLYOLS UTILIZING AN ALKOXYLATED ALKYL OR ALKYLPHENYL POLYOXYALKYLENE ISOPROPYLAMINE

[75] Inventor: Michael Cuscurida, Austin, Tex.

[73] Assignee: ARCO Chemical Company, Newtown Square, Pa.

[21] Appl. No.: 31,498

[22] Filed: Mar. 30, 1987

Related U.S. Application Data

[63] Continuation-in-part of Ser. No. 780,155, Sep. 26, 1985, Pat. No. 4,683,277.

[51] Int. Cl.$^4$ ............................................. C08F 2/30
[52] U.S. Cl. .................................. 526/209; 524/245; 524/246; 524/368
[58] Field of Search .................................. 526/209

[56] References Cited

U.S. PATENT DOCUMENTS 4,137,381 1/1979 Kraus et al. .................. 524/246
4,683,272 7/1987 Cuscurdia et al. ............. 525/404
4,689,366 8/1987 Hoefer .......................... 526/209

Primary Examiner—John Kight
Assistant Examiner—Frederick F. Krass
Attorney, Agent, or Firm—David L. Mossman; Steve Rosenblatt

[57] ABSTRACT

A vinyl polymer polyol is prepared using a dispersing agent comprising a monoamine of the formula:

$$R_1-O-(CH_2CH(R_2)O)_xCH_2CH(CH_3)NH_2$$

or $$R_3(CH_2CH_2O)_A(CH_2CH(CH_3)O)_BCH_2CH(CH_3)NH_2$$

wherein:
$R_1$ is an alkylphenyl of 14 to 26 carbon atoms,
$R_2$ is independently hydrogen or methyl,
$R_3$ is an alkyl of from 1 to 20 carbon atoms,
x ranges from 2 to 10,
A ranges from 0 to 30, and
B ranges from 1 to 8.

This monoamine is reacted with from 6 to 30 moles of ethylene oxide, propylene oxide or mixture thereof. Optionally, the acid salt is formed. The alkoxylated monoamine is present in conjunction with a conventional polyether polyol.

15 Claims, No Drawings

100
DISPERSING AGENTS FOR PRODUCING VINYL POLYMER POLYOLS UTILIZING AN ALKOXYLATED ALKYL OR ALKYLPHENYL POLYOXYALKYLENE ISOPROPYLAMINE

CROSS-REFERENCE TO RELATED APPLICATION

This application is a continuation-in-part of application Ser. No. 780,155 filed Sept. 26, 1985 held allowable.

BACKGROUND OF THE INVENTION

1. Field of the Invention

The invention relates to dispersions of vinyl polymer polyols. The invention also relates to a composition comprising pigment in a dispersing agent for use as printing ink.

2. Description of Other Relevant Methods in the Field

It is known that stable dispersions of polyols are useful in the preparation of polyurethanes. U.S. Pat. No. 4,293,470 discloses a stable polyurea polymer polyol, useful in the manufacture of flexible polyurethane foams, which is made by the reaction of a hydroxyl-containing amine with a 3000 to 8000 molecular weight polyether polyol and an organic polyisocyanate followed by quenhhing with a secondary amine. U.S. Pat. No. 4,296,213 teaches that a polyurea polymer polyol may also be prepared by the reaction of a hydroxyl-containing amine, a polyether polyol and an organic polyisocyanate.

U.S. Pat. No. 4,398,955 to Stansfield et al., teaches that stable dispersions of particulate solid pigment are formed with the aid of a dispersing agent which is a tertiary amine or mineral acid or aromatic carboxylic or sulphonic acid salt. The amine contains at least one polymeric group which is a polyoxyalkylene chain or a polyoxyalkylene-carbonyl chain. These dispersions are useful for making inks or paints.

U.S. Pat. No. 4,101,690 to Miyamoto et al. teaches pigment compositions comprising a compound obtained by the reaction of an amine with propylene oxide and ethylene oxide.

SUMMARY OF THE INVENTION

The invention is a vinyl polymer polyol prepared by the process comprising polymerizing via a free radical initiated reaction a vinyl monomer in the presence of a dispersing medium. The dispersing medium comprises a polyol in a dispersing agent.

The dispersing agent is prepared by reacting a compound of the formula:

$R^2$ is independently hydrogen or methyl,
$R^3$ is an alkyl of from 1 to 20 carbon atoms,
x ranges from 2 to 10,
A ranges from 0 to 30, and
B ranges from −1 to 8, 1 to 8.

With from 6 to 30 moles of ethylene oxide, propylene oxide or mixtures thereof. Optionally, the mineral acid, aromatic carboxylic acid or sulfonic acid salt of the dispersing agent is formed. The dispersing agent comprises 0.5 to 10 wt % of the vinyl polymer polyol. The vinyl polymer polyols dispersed according to the inventive method have a lower viscosity than those made without the dispersing agent. Accordingly the polymer polyols are more suitable for the preparation of molded polyurethane foam. The dispersed polymer polyol is reacted with an organic polyisocyanate in the presence of a polyurethane catalyst and optionally in the presence of a blowing agent to yield a polyurethane foam.

DESCRIPTION OF THE PREFERRED EMBODIMENTS

By utilizing a dispersing agent consisting of alkyl polyoxyalkylene isopropyl amines or alkylphenylpolyoxyalkylene isopropyl amines, alkoxylated with 6 to 30 moles of ethylene oxide, propylene oxide or mixtures thereof, vinyl polymer polyols with reduced viscosity and improved stability are formed.

The Reactants

The monomers useful in making the vinyl polymer polyol of this invention are the polymerizable monomers characterized by the presence therein of at least one polymerizable ethylenically unsaturated group. The monomers can be used singly or in combination to produce homopolymer/reactive solvent products or copolymer/reactive solvent combinations, respectively.

Preferably, the monomers contain the double bond in a vinyl group. These monomers are well known in the art and include the hydrocarbon monomers such as styrene, butadiene, isoprene, 1,4-pentadiene, 1,6-hexadiene, 1,7-octadiene, alpha-methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl 4-vinylbenzoate, phenoxystyrene p-vinyldiphenyl sulfide, p-vinylphenyl oxide, and the like. Also suitable are acrylic and substituted acrylic monomers such as acrylic acid, methacrylic acid, acrylonitrile, methyl methacrylate, methyl acrylate, 2-hydroxyethyl acrylate, 2-hydroxyethyl methacrylate, cyclohexylmethacrylate, benzyl methacrylate, isopropyl methacrylate, octyl methacrylate, methacrylonitrile, methyl alpha-chloroacrylate, ethyl alpha-ethoxy acrylate, methyl alphaacetaminoacrylate, butyl acrylate, 2-ethylhexyl acrylate, phenylacrylate, phenyl methacrylate, alpha-chloroacrylonitrile, N,N-dimethylacrylamide, N,N-dibenzylacrylamide, N-butylacrylamide, methacrylyl formamide, and the like. The vinyl esters, vinyl ethers, vinyl ketones, etc. are also useful, such as vinyl acetate, vinyl chloroacetate, vinyl alcohol, vinyl butyrate, isopropenyl acetate, vinyl formate, vinyl acrylate, vinylmethacrylate, vinyl methoxy acetate, vinyl benzoate, vinyl iodide, vinyl toluene, vinyl naphthalene, vinyl bromide, vinyl fluoride, vinyldiene bromide, 1-chloro-1-fluoroethylene, vinyldiene fluoride, vinyl methyl ether, vinyl ethyl ether, vinyl propyl ether, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyacetamide, N-vinylpyrrolidone, vinyl imidazole, divinyl sulfide, divinyl sulfone, sodium vinyl sulfoxide, methyl vinyl sulfonate, N-vinyl pyrrole and the like. Other compounds expected to be useful are dimethyl fumarate, dimethyl maleate, maleic acid, crotonic acid, fumaric acid, itaconic acid, monomethyl itaconate, t-butyl aminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

Vinyl monomers are preferred, and styrene, acrylonitrile, methyl methacrylate, methyl acrylate and butadiene are particularly preferred. It is especially preferred that styrene and acrylonitrile be used together. The preferred weight ratio of styrene to acrylonitrile ranges from 9:1 to 1:9. Any of the known chain transfer agents can be present, if desired.

Polymerizing the monomers in the dispersing medium occurs in the presence of a catalytically effective amount, preferably 0.1 to 5.0 wt % based on total feed, of a conventional free radical catalyst known to be suitable for the polymerization of ethylenically unsaturated monomers. Preferred catalysts are the azo-bis compounds such as 2,2'-azobis-(2,4-dimethylvaleronitrile), 2,2'-azobis-(isobutyronitrile), 2,2'-azobis-(2-methylbutyronitrile) and 2,2'-azobis-(cyanocyclohexane) and the like. Other preferred catalysts are organic peroxides, peroxydicarbonates and peroxy esters. Illustrative catalysts are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, para methane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridole, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, persuccinic acid, diisopropyl peroxy dicarbonate, and the like. A mixture of catalysts may also be used.

Especially preferred are polymerization catalysts manufactured by the E. I. duPont de Nemours and Co. such as 2,2'-azo-bis-(2,4-dimethylvaleronitrile), 2,2'-azobis-(isobutyronitrile), 2,2'-azobis-(2-methylbutyronitrile) and 1,1'-azobis-(cyanocyclohexane). These products are commercially sold as Vazo ® 52, 64, 67, and 88, respectively.

The polymerization is carried out in a dispersing medium comprising a polyol and a dispersing agent synthesized from a selected alkoxylated monoamine. One monoamine useful in preparing the dispersing agents of this invention has the formula

R₁—O(CH₂CH(R₂)O)ₓCH₂CH(CH₃)NH₂

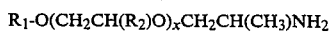

wherein:
R₁ is an alkyl-substituted phenyl group of 14 to 26 carbon atoms,
R₂ is independently hydrogen or methyl, and
x ranges from 2 to 10.

These monoamines are sold by Texaco Chemical Co. under the Surfonamine ® trademark. Those available commercially include:

Structure

|  | Structure |
|---|---|
| Surfonamine ® MNPA-380 | nonylphenyl-1EO—2PO—NH₂ |
| Surfonamine ® MNPA-510 | nonylphenyl-4EO—2PO—NH₂ |
| Surfonamine ® MNPA-750 | nonylphenyl-9.5EO—2PO—NH₂ |
| Surfonamine ® MNPA-860 | nonylphenyl-12EO—2PO—NH₂ |

Another monoamine useful in preparing the dispersing agents of this invention has the formula:

R₃(CH₂CH₂O)₄(CH₂CH(CH₃)O)₈CH₂CH(CH₃)NH₂

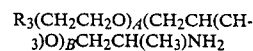

wherein:
R₃ is an alkyl of from 1 to 20, preferably 1 to 4 carbon atoms,
A ranges from 0 to 30, preferably 1 to 20, and
B ranges from 1 to 8.

Some of these monoamines are sold by Texaco Chemical Co. under the Jeffamine ® trademark. Those available commercially include:

|  | R₃ | A | B |
|---|---|---|---|
| Jeffamine ® M-300 | methyl | 9 | 1 |
| Jeffamine ® M-360 | butyl | 4 | 1 |
| Jeffamine ® M-600 | methyl | 1 | 8 |
| Jeffamine ® M-1000 | methyl | 18.6 | 2.6 |

These monoamines are reacted with from 6 to 30 moles of an alkylene oxide selected from the group consisting of ethylene oxide, propylene oxide and mixtures thereof. The alkoxylation is carried out with an alkoxylation catalyst, e.g. as alkali metal hydroxide such as potassium hydroxide under alkoxylation conditions.

Optionally, the alkoxylated monoamine is reacted with a mineral acid or with an aromatic carboxylic or sulphonic acid to form a salt.

The polyol compositions of the dispersing medium include polyols having a functionality of from two to about six and having a molecular weight of from about 2000 to 10,000, preferably from about 2000 to 7000. These polyols are prepared by a well known process which involves the reaction of a polyhydric initiator such as trimethylolpropane, glycerol, 1,2,6-hexanetriol, sorbitol, pentaerythritol, and the like, with an alkylene oxide such as ethylene oxide, propylene oxide and butylene oxide, or mixtures of ethylene oxide with propylene oxide and/or butylene oxide. This reaction is carried out with an alkoxylation catalyst, generally an alkali metal hydroxide such as potassium hydroxide. The alkoxylation reaction is continued until the product attains the desired molecular weight.

The Reaction Conditions

To obtain the vinyl polymer polyols of this invention, all or a portion of the polyol and the dispersing agent added first to the reaction vessel. It is usually best that the material be heated to the reaction temperature before the next step, which is the slow or dropwise addition of a mixture of the vinyl monomer component (which may be more than one kind of vinyl monomer), the free radical initiator and the remainder of the polyol. After the reaction proceeds for a short time (0.25 to 1.0 hour), the reaction mixture is digested for approximately 15 minutes and volatiles are stripped off by conventional techniques to leave the vinyl polymer polyol product.

The reaction temperature should be about 75° to 150° C., preferably 90° to 140° C. Reaction pressures may range from atmospheric pressure to about 100 psig. When mixed vinyl monomers are used, such as styrene and acrylonitrile, the weight ratios should range from about 9:1 to 1:9, or preferably 30:70 to 70:30. The amount of polymer in the dispersing medium, known as polymer loading, may range from 5 to about 50 wt %, preferably from about 10 to 40 wt %.

In another embodiment, the invention is a composition comprising pigment, organic solvent and the alkoxylated monoamine.

As examples of inorganic pigments there may be mentioned titanium dioxide, zinc oxide, cadmium sulphide, iron oxides, vermillion, ultramarine and chrome pigments includin chromates of lead, zinc, barium and calcium, the various mixtures and modifications thereof such as are commercially available as greenish-yellow to red pigments under the names primrose, lemon, middle, orange, scarlet and red chromes and especially Prussian Blue. Such pigments are described in, for example, Volume 2 of the 2nd Edition of the Colour Index which was published in 1956 under the heading "Pigments" and in subsequent authorized amendments thereto.

The term polar organic medium includes organic liquids capable of forming moderate or strong hydrogen bonds are described in the article entitled "A three dimensional approach to solubility" by Crowley et al. in Journal of Paint Technology, Vol. 38, 1966, at page 269. Such organic liquids generally have a hydrogen bonding number of 5 or more as defined in the above-mentioned article.

As examples of such polar organic liquids there may be mentioned, amines, ethers, especially lower alkyl ethers, organic acids, esters, ketones, glycols, alcohols and amides.

Preferred polar organic liquids are dialkyl ketones, alkyl esters of alkanecarboxylic acids, alkanols and especially those containing up to and including a total of 6 carbon atoms. As examples of the preferred and especially preferred liquids there may be mentioned dialkyl ketones such as acetone, methylethylketone (MEK), diethylketone, diisopropylketone, methylisobutylketone and diisobutylketone, alkyl esters such as methyl acetate, ethyl acetate, isopropyl acetate, ethylformate, methyl propionate and ethyl butyrate and alkanols such as methanol, ethanol, n-propanol, isopropanol, n-butanol and isobutanol.

The dispersions of the invention preferably contain from 10% to 80% and more especially from 20% to 70% by weight of the solid based on the total weight of the dispersion depending on the density of the solid, although for reasons of economy it is desirable to operate at pigment concentrations of about 40%, more preferably at least 50% by weight. The quantity of dispersing agent contained in these dispersions is preferably from 2% to 50% and more especially from 5% to 30% by weight based on the weight of the solid. The achievement of finely divided inorganic pigment dispersions containing 50% or more by weight of pigment is an important feature of the present invention which can lead to significant improvements in the economics of ink and paint manufacture.

The dispersions of the invention are particularly useful in the preparation of inks based on polar solvents especially printing inks for use in package printing. They are however also of use in stationery inks and paints which are based on polar solvents. Where the solvent is compatible with a plastics material, e.g. plasticizer, the dispersion may be used to introduce the solid, especially where the solid is a pigment, into the plastics material.

According to a further feature of the invention we provide an ink, especially a printing ink, or a paint prepared from a dispersion as herebefore defined by addition of the other ingredients conventionally present in such ink or paint, e.g. binders, thickeners, preservatives and further solvents, as diluent.

The inks which are made from the above-mentioned dispersions have enhanced gloss, transparency, brightness and strength compared with such compositions not containing these components or prepared by adding the dispersing agent to a conventional ink made by milling the pigment or dyestuff in the presence of the binder.

The dispersions of the invention can be obtained by any of the conventional and well known methods of preparing dispersions. Thus the solid, the dispersing agent and the polar organic medium preferably in a liquid form may be mixed in any order and the mixture then subjected to a mechanical treatment to reduce the particle size of the solid, for example by ball milling, bead milling or gravel milling until a dispersion is formed in which the mean diameter of the particles of the solid is desirably less than 10 microns and preferably less than 1 micron.

Where the dispersing agent is the salt of a tertiary amine with an acid it is preferred to prepare the dispersing agent in situ by mixing together the amine, the acid and the polar organic medium following which the amine and acid react together to form theamine salt which is the dispersing agent. The solid is then added and the dispersion prepared as hereinbefore described.

While the dispersing agent may be soluble to a substantial extent in the polar organic medium it is not essential that it is more than sparingly soluble and in fact there is some advantage with sparingly soluble dispersing agents since these have a lesser tendency to bleed during applications of the dispersions and inks made from them.

The invention is shown by way of Example.

EXAMPLE I

This example will illustrate the two-step preparation of the Surfonamine ® MNPA-750 based dispersing agent of this invention.

Step 1

Into a five-gallon kettle was charged 10 lb of Surfonamine ® MNPA-750. The reactor was then purged with nitrogen and heated to 125° C. Propylene oxide (2.0 lb) was then reacted at 125°–150° C. at 60 psig. Approximately 1.75 hours were required for addition of the propylene oxide. The reaction mixture was then digested three hours at 150° C., stripped under minimum pressure, and polish filtered. The finished product had the following properties:

| Properties | |
|---|---|
| Total amine, meq/g | 1.19 |
| Tertiary amine, meq/g | 0.89 |
| Hydroxyl no., mg KOH/g | 129 |
| Water, wt % | 0.02 |
| Appearance | Light yellow, viscous liquid |

Step 2

Into a ten-gallon kettle were charged 10 lb of the two-mole propylene oxide adduct of Surfonamine® MNPA-750 (Step 1) and 181.6 g 45% aqueous potassium hydroxide. The reactor was then thoroughly purged with prepurified nitrogen and heated to 100° C. The reaction charge was then dewatered by vacuum stripping to a minimum pressure and then with nitrogen for 30 minutes. Ethylene oxide (4.6 lb) was then reacted at 105°–110° C. at 20 psig over a 40 minute period. The reaction mixture was then digested 30 minutes to an equilibrium pressure. Propylene oxide (4.7 lb) was then added at 105°–110° C. at 50 psig. After digestion to an equilibrium pressure, the alkaline product was neutralized by stirring two hours with 490 g Magnesol® 30/40 which was charged as an aqueous slurry. The neutralized product was then vacuum stripped to a minimum pressure, nitrogen stripped, and filtered. The finished product had the following properties:

| Properties | |
|---|---|
| Total amine, meq/g | 0.606 |
| Tertiary amine, meq/g | 0.48 |
| Hydroxyl no., mg KOH/g | 69.3 |
| Water, wt % | 0.03 |
| pH in 10:6 isopropanol-water | 11.5 |
| Viscosity, °F., cs | |
| 77 | 463 |
| 100 | 218 |
| PO/EO (NMR) | 53.9/46.1 |

EXAMPLE 2

Into a two-liter four-necked flask equipped with a stirrer, thermometer, dropping funnel, water condenser, and nitrogen source were charged 400 g of a 500 m.w. high reactivity polyether triol (Thanol® SF-5505; Texaco Chemical Co.) and 5 g of the Surfonamine® MNPA-750 alkylene oxide adduct of step 2 of Example 1. The reaction charge was then heated to 120° C. and a freshly made mixture of 400 g Thanol® SF-5505, 90 g styrene, 110 g acrylonitrile, and 5.0 g VAZO® 67 polymerization initiator (E.I. DuPont De Nemours and Co.) was added dropwise over a four hour period. The temperature was maintained at 120°–121° C. throughout the reaction. The reaction mixture was then digested 45 minutes at 120° C. and vacuum stripped for 30 minutes. Twelve grams of unreacted volatiles were recovered corresponding to a monomer conversion of 94%. The finished product was an off-white viscous dispersion which had the following properties. For comparison, properties of polymer polyols made in the same manner, which contained no dispersing agent, are also shown.

| Properties | Dispersing agent | | |
|---|---|---|---|
| | yes | no | no |
| Acid no., mg KOH/g | 0.21 | 0.13 | 0.019 |

-continued

| Properties | Dispersing agent | | |
|---|---|---|---|
| | yes | no | no |
| Hydroxyl no., mg KOH/g | 29 | 32 | 32.3 |
| Water, wt % | 0.09 | 0.02 | 0.01 |
| Viscosity, 77° F., cps | 4600 | 7020 | 5190 |

EXAMPLE 3

Into a one-pint can was charged 61 g of ethanol, 5.3 g of the Surfonamine® MNPA-750 alkylene oxide adduct of step 2, example 1, and 30 g copper phthalocyanine. The mixture was then mixed with a high shear mixer (Dispersator) until a homogeneous thixotropic mixture was obtained. The mixture became more fluid on further mixing. The mixture was suitable for use in a printing ink composition.

While particular embodiments of the invention have been described, it is well understood that the invention is not limited thereto since modification may be made. It is therefore contemplated to cover by the appended claims any such modifications as fall within the spirit and scope of the claims.

What is claimed is:

1. A vinyl polymer polyol prepared by polymerizing via a free radical initiated reaction a monomer component of at least one vinyl monomer in the presence of a dispersing medium comprising a polyether polyl which does not contain nitrogen in a dispersing agent comprising the reaction product of a compound selected from the group consisting of an alkyl polyoxyalkylene isopropyl amine and an alkylphenyl polyoxyalkylene isopropyl amine, with an alkylene oxide selected from the group consisting of ethylene oxide, propylene oxide and mixtures thereof.

2. The vinyl polymer polyol of claim 1 wherein the dispersing agent is a salt of the said reaction product with a mineral acid, an aromatic carboxylic acid or sulfonic acid.

3. The vinyl polymer polyol of claim 1 wherein the monomer component is selected from the group consisting of styrene, acrylonitrile, methyl methacrylate, methyl acrylate, butadiene and mixtures thereof.

4. The vinyl polymer polyol of claim 1 wherein the said monomer component is styrene.

5. The vinyl polymer polyol of claim 1 in which the polymer loading of the dispersing medium is in the range of about 5 to 50 wt. %.

6. The vinyl polymer polyol of claim 1 in which a free radical initiator is employed in a concentration of from 0.1 to 5.0 wt. % and which is selected from the group consisting of organic peroxides, peroxydicarbonates, peroxyesters, 2,2'-azobis-(2,4-dimethylvaleronitrile), 2,2'-azobis- (isobutyronitrile), 2,2'-azobis-(2-methylbutyronitrile), 1,1'-azobis (cyanocylclohexane), and mixtures thereof.

7. The vinyl polymer polyol of claim 1 in which the reaction is conducted at a temperature in the range of 75° to 150° C. and at a pressure in the range of atmospheric to about 100 psig.

8. The vinyl polymer polyol of claim 1 wherein the said polymer polyol has a functionality of from about two to about six and a molecular weight of about 2000 to 10,000.

9. The vinyl polymer polyol of claim 1 wherein the said polyether polyol is prepared by reacting a polyhydric alcohol initiator with an alkylene oxide selected from the group consisting of ethylene oxide, propylene oxide and mixtures thereof.

10. The vinyl polymer polyol of claim 1 wherein the said dispersing agent is the reaction product of an alkyl polyoxyalkylene isopropyl amine of the formula:

$$R_3(CH_2CH_2O)_A(CH_2CH(CH_3O)_BCH_2CH(CH_3)NH_2$$

where $R_3$ is alkyl group of from 1 to 20 carbon atoms, A ranges from 0 to 30 and B ranges from 1 to 8, with from 6 to 30 moles of an alkylene oxide selected from the group consisting of ethylene oxide, propylene oxide and mixtures thereof.

11. The vinyl polymer polyol of claim 10 wherein the dispersing agent is the salt of the said reaction product with a mineral acid, an aromatic carboxylic acid or sulfonic acid.

12. The vinyl polymer polyol of claim 10 where $R_3$ is alkyl group of from 1 to 4 carbon atoms.

13. The vinyl polymer polyol of claim 1 wherein the said dispersing agent is the reaction product of an alkyl-phenyl polyoxyalklene isopropyl amine of the formula:

$$R_1-O-(CH_2CH(R_2)O)_xCH_2CH(CH_3)NH_2,$$

wherein $R_1$ is an alkyl-substituted phenyl group of 14 to 26 carbon atoms $R_2$ is independently hydrogen or methyl and x ranges from 2 to 10, with from 6 to 30 moles of an alkylene oxide selected from the group consisting of ethylene oxide, propylene oxide and mixtures thereof.

14. The vinyl polymer polyol of claim 13 wherein the dispersing agent is the salt of the said reaction product with a mineral acid, an aromatic carboyxlic acid or sulfonic acid.

15. The vinyl polymer polyol of claim 13 wherein $R_1$ is a nonyl-substituted phenyl group.

* * * * *